United States Patent [19]

Baba

[11] 3,740,826

[45] June 26, 1973

[54] METHOD FOR PRODUCING COMPOSITE METALLIC PIPE BY EXPLOSION PRESSURE WELDING

[75] Inventor: Nobuyoshi Baba, Shiga, Japan

[73] Assignee: Asahi Kasei Kogyo Kabushiki Kaisha, Tokyo, Japan

[22] Filed: June 17, 1971

[21] Appl. No.: 153,998

[30] Foreign Application Priority Data
July 2, 1970 Japan................................ 45/57256

[52] U.S. Cl................. 29/470.1, 29/474.4, 29/479
[51] Int. Cl............................................ B23k 21/00
[58] Field of Search...................... 29/421 E, 470.1, 29/486, 497.5, 474.4, 479

[56] References Cited
UNITED STATES PATENTS
3,022,544  2/1962  Coursen et al....................... 18/59.3
3,364,561  1/1968  Barrington.......................... 29/470.1
3,434,197  3/1969  Davenport........................... 29/470.1

Primary Examiner—J. Spencer Overholser
Assistant Examiner—Ronald J. Shore
Attorney—James E. Armstrong and Harold C. Wegner

[57] ABSTRACT

A composite metallic pipe is produced by explosion pressure welding, that is, by filling a thermoplastic material capable of being converted into a fluid when heated, and solidified at the ambient temperature, for example, asphalt compound or tar pitch, at the outside of an outer pipe when an explosive is charged at the inside of an inner pipe, or at the inside of an inner pipe when the explosive is charged at the outside of the outer pipe, thereby to integrate the pipe with the plastic material and increase the strength of the pipe such that the pipe acts as an incompressible steel rod or an outer pipe having a large wall thickness against detonation pressure and prevent deformation of the pipe. A pipe having a wall thickness of 1 mm or less as a substrate can be advantageously welded to a composite pipe by explosion pressure.

5 Claims, 2 Drawing Figures

METHOD FOR PRODUCING COMPOSITE METALLIC PIPE BY EXPLOSION PRESSURE WELDING

This invention relates to a method for producing a composite metallic pipe by explosion pressure welding, and more particularly to an art for preventing deformation or breakage of the composite metallic pipe at the explosive pressure welding, whereby a composite metallic pipe can be produced from a metallic pipe having a particularly small wall thickness as a substrate material (a metallic pipe which is not in direct contact with an explosive) essentially without any change in diameter of the metallic pipe having the small wall thickness.

Heretofore, many methods have been proposed for producing a composite metallic pipe. For example, a joint melting method, casting method, welding method, explosion pressure welding method, etc., can be mentioned. However, these prior art methods have many technical and economical problems. Furthermore, these prior art methods fail to produce reliability in the physical properties of a product, particularly in the properties of the bonded joint part. Therefore, these methods have not been widely utilized in the industries up to now in spite of many latent demands for these methods.

As a result of extensive studies on a method for producing a composite metallic pipe by explosion pressure welding, the present inventors have found a novel method based on an improvement in the explosion pressure welding, where said disadvantages of the prior art methods have been completely eliminated.

That is to say, according to the present invention, a deformation and breakage of a pipe can be prevented at the point of explosion welding, whereby a composite metallic pipe, particularly a composite metallic pipe having a small wall thickness can be practically produced. Heretofore, the deformation and breakage of a pipe has been a problem in producing a composite metallic pipe having a small wall thickness. Therefore, a method for preventing an outer pipe from breakage by providing a metallic sheath cylinder having a large wall thickness outside the outer pipe has been employed when an explosive is charged in an inner pipe to drive the inner pipe towards the outer pipe by detonation of the explosive and pressure weld the inner pipe to the outer pipe, to solve the problem. On the other hand, when an explosive is charged outside the outer pipe to drive the outer pipe towards an inner pipe by detonation of the explosive, a liquid filler is completely filled in the inner pipe to prevent the breakage and deformation of the inner pipe.

However, in the former method, there is such a disadvantage since various metallic sheath cylinders must be prepared in advance according to diameters of the pipes to be welded by explosion. On the other hand, in the latter method, operation must be carried out cautiously in a complicated manner, because a liquid tight seal is required for the explosion welding. Furthermore, in the latter method, deformation often takes place at both ends of the pipe. There has been proposed another method for explosion welding, which comprises inserting a metallic rod into the inner pipe, effecting explosion welding in the inserted state, and removing the metallic rod after the explosion welding. However, the method has such disadvantages in that the welding cost is higher and the compressed metallic rod is difficult to remove after the explosion welding.

In view of these disadvantages encountered in the prior art methods, the present inventors have discovered a new method and have succeeded in eliminating these disadvantages in the explosion welding method by using more effective fillers than the liquid, without using any metallic sheath cylinder. Therefore, an object of the present invention is to provide a method for producing a composite metallic pipe, which is also applicable to explosion welding of a metallic pipe having a smaller wall thickness and a larger diameter.

The present invention consists of a method for producing a composite metallic pipe, where an inner pipe is inserted into an outer pipe at a suitable clearance, an explosive is charged at the outside of the outer pipe or at the inside of the inner pipe, and an initiation of explosion is carried out from one end of the explosive thereby propagating a detonation of the explosive substantially in parallel with the axis of the pipes, and which further comprises densely filling a thermoplastic filler, capable of being converted into a fluid when heated and being solidified at least at the ambient temperature, at the outside of the outer pipe when the explosive is charged into the inner pipe, or at the inside of the inner pipe when the explosive is charged at the outside of the outer pipe, thereby to integrate the filler with the pipe and increase a strength of the pipe as if the integrated pipe serves a substantially incompressible steel rod or an outer pipe having a larger wall thickness against the detonation of said explosive.

Now, the present invention will be explained, referring to the accompanying drawings.

Figure 2:
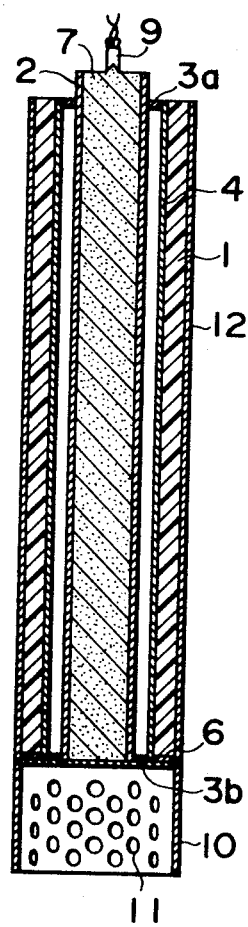
FIG. 2 shows an embodiment for carrying out the explosion welding according to the inner pipe-driving system.

In both Figures, numeral 1 is a thermoplastic filler, 2 an inner pipe, 3a, 3b a clearance retainer, 4 an outer pipe, 5 an explosive container cylinder, 6 a plug at the bottom of explosive and filler, 7 a powdery explosive, 8 a disc for preventing explosion gas invasion, 9 an electric detonator, 10 a cylinder for preventing bending of the composite metallic pipe at the explosion welding, 11 explosion gas outlet openings provided along the cylinder, and 12 a metallic cylinder for preventing breakage of the outer pipe.

The filler to be densely packed at the inside of the inner pipe or at the outside of the outer pipe is most preferred when it has a sufficient resistance at the point of explosion welding when integrated with the pipe, even though a pipe having a smaller wall thickness is used, or when integrated with the pipe and the metallic sheath cylinder, and when it is capable of being readily removed after the explosion welding. When a soft metal pipe such as aluminum or copper pipe is used as the metallic pipe, it is necessary to properly select a filler which will not cause any damage on the surface of the pipe. Alternatively, a protective film may be provided between the filler and the pipe.

As a result of various studies on a filler which can satisfy such conditions, it has been found that a thermoplastic material capable of being converted into a fluid when heated, being solidified when cooled and being converted again into a fluid when heated, for example, an asphalt compound, tar pitch, etc., is the most preferable filler. These fillers can be poured into the inside of the inner pipe or the outside of the outer pipe as a fluid, without causing any unevenness in the density of the poured fillers, and can be densely and tightly joined to the metallic pipe. The thus filled fillers can act as a rigid body capable of sufficiently withstanding to the pressure exerted at the explosion welding, when the fillers are cooled and solidified. The fillers can be readily removed by reheating after the explosion welding. Furthermore, a small amount of the residues, for example, oils and fats, on the surface of the pipe, after the bulk of the fillers has been removed, can be readily removed with kerosene.

In addition, solid matters may be added to and mixed with said thermoplastic filler to increase hardness when the filler is solidified or to merely increase the volume of the filler, and the resulting filler mixture can be used without any trouble. When, for example, granular materials or powdery materials such as washed sand, slaked lime, starch, metal powders, etc., are used alone or in combination as the filler, there develops an unevenness in the density and compression at the explosion. Therefore, the effect of the present invention cannot be attained. The curing materials, for example, gypsum or quick setting cement, can act as the rigid body sufficiently, but since the materials undergo compression under explosion pressure, it is very difficult to remove these fillers after the explosion welding. Therefore, it is not industrially preferable to use such curing materials.

In pouring the thermoplastic filler, it is necessary to pour the filler slowly and carefully from the bottom end of the pipe while cooling the pipe and provide a sink head at the upper end of the pipe to prevent occurrence of unevenness in the density due to bubbles or cavities or occurrence of clearances between the metallic pipe and the solidified filler.

A clearance between the inner pipe and the outer pipe can be maintained according to the conventional manner, such as by inserting a small metallic rod, wood pieces or synthetic resin ring between two ends of the inner pipe and the outer pipe to support these two ends of the pipes. In that case, straight pipes without any curvature should be used as the inner and outer metallic pipes. Further, it is necessary to arrange the pipes so that no operation of explosion welding may be disturbed. It is desirable to use an annular clearance retainer at the explosion-initiating end to tightly seal the clearance and prevent the explosion gas from entering into the clearance from the explosion-initiating end, but it is desirable to arrange a few cut pieces of steel wire or the like in parallel with the axis of the pipes within the clearance retainer at the tip end part to allow the gas held in the clearance to be readily discharged.

The inside surface of the outer pipe must be exposed as an active and clean metallic surface in the same manner as the outside surface of the inner pipe. When an explosive to be discharged at the outside of the outer pipe is in a sheet form, the explosive can be wrapped around the outside of the outer pipe directly or through a buffer material to an even thickness, but when a powdery explosive is used, the explosive is charged along the entire outside surface of the outer pipe by charging the explosive into a container comprising a cylinder inserted around the outer periphery of the outer pipe and a plug to seal the bottom end of the cylinder. One end of the explosive is initiated to explosion around the periphery at the same time and the detonation is allowed to proceed substantially in parallel with the axis of the pipes. Various procedures are available for effecting such detonation. As shown in the drawings, a procedure for forming an explosive so as to be connected to the center of the core at the upper end and initiating explosion by a detonator arranged at the center part of the explosive, is simplest and most convenient to attain the desired object.

As described above, a composite metallic pipe having an excellent pressure welding can be obtained without changing the diameter of a metallic pipe as a substrate almost at all, according to the present invention. For example, when a copper pipe having an inner diameter of 86 mm and a wall thickness of 0.7 mm was used as a substrate and a steel pipe having an outer diameter of 93 mm and a wall thickness of 2.5 mm was inserted into the copper pipe and subjected to explosion welding, the thus obtained composite metallic pipe was only deviated from the core center by about 0.5 mm. Microscopic observation of the pressure welded interfacial boundary of the thus obtained composite metallic pipe revealed that there was formed an interfacial corrugation specific to an adhesion of such explosion welding and a good pressure welding state was attained. To determine the pressure welding strength of the interfacial boundary, a shearing test was carried out according to ASTM (American Society for Testing and Materials) Standards. The pressure welding strength of the explosion welded pipe had a value equal or superior to that of the component pipe used for the adhesion.

Now, the present invention will be explained in detail referring to Examples.

EXAMPLE 1

Figure 1:
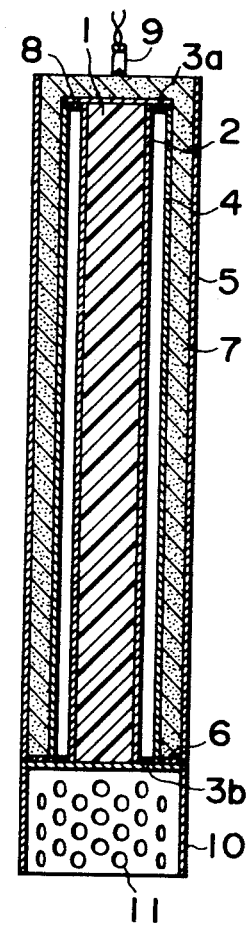
FIG. 1 shows an embodiment for carrying out the explosion welding according to the outer pipe driving system.

A special asphalt compound 1 prepared by mixing a blown asphalt as a base material with synthetic rubber, synthetic resin, special oil, etc. (a product of Fuji Rekisei Kogyo Co. Ltd., Japan: softening point of 90° – 100° C and penetration of 10 – 20 at 25° C) was heated and melted, and densely filled into a copper pipe 2 having an inner diameter of 83 mm, outer diameter of 84 mm and length of 505 mm, whose outside surface was polished with a polishing paper No. 120, as shown in FIG. 1. When the asphalt compound was poured into the pipe, a sink head part was provided at the upper end of the copper pipe 2 and after the cooling and solidification, the sink head part, which was reduced in the weight, was cut off and removed from the upper end of the copper pipe. The upper surface of the cut-off filler was finished to a plane surface. In this manner, the asphalt compound 1 was filled and solidified, whereby a strength of the copper pipe 2 was substantially increased. A steel pipe 4 having an inner diameter of 87.2 mm, outer diameter of 91.7 mm and length of 505 mm, whose inside surface was polished with a polishing paper No. 120, was arranged coaxially with the copper pipe 2 at the outside of the copper pipe 2. A steel ring 3a having a thickness of 1.6mm and a width of 5 mm was inserted at the upper end of a clearance between the copper pipe 2 and the steel pipe 4 so that the clearance may be retained uniformly, and six pieces 3b of steel wire having a diameter of 1.6 mm were inserted at the bottom end part of the clearance in parallel with the axis of the pipes and fixed thereto. To charge an explosive 7 at the outer periphery of the steel tube 4, a paper cylinder 5 having an inner diameter of 125 mm, outer diameter of 133 mm and length of 505 mm was arranged coaxially with the steel pipe 4 at the outside of the steel pipe 4, and a flange-like plug 6 of polyvinyl chloride plate having an inner diameter of 91.7 mm, outer diameter of 125 mm and thickness of 5 mm was joined and fixed to the bottom ends of the steel pipe 4 and the paper cylinder 5. An explosive 7 consisting of 10 parts by weight of penthrit, 3 parts by weight of starch and 87 parts by weight of ammonium nitrate was densely filled in a container consisting of the steel pipe 4, the paper cylinder 5 and the plug 6, and a copper disc 8 having a diameter of 91.7 mm and a thickness of 5 mm was placed upon the upper end part of the explosive 7 to cover the outer pipe and prevent the invasion of the explosion gas into the clearance. An electric detonator 9 was further placed above the upper surface of the disc 8 at the center of the explosive, whereby the powdery explosive 7 is exploded.

In the inside of the thus obtained composite metallic pipe, the asphalt compound was still filled and therefore the outside of the composite metallic pipe was evenly heated to about 200°C by a gas burner, whereby only a portion in contact with the composite metal pipe was melted, without melting the entire asphalt compound, and the asphalt compound could be removed in a rod-like state. Furthermore, to completely remove the asphalt compound attached to the inside wall of the pipe, the inside wall was washed with kerosene and trichloroethylene, whereby a composite metallic pipe having a small wall thickness could be obtained without any change in the inner diameter of the pipe due to the explosion pressure welding. To determine the pressure welding state of the thus obtained copper-steel composite metallic pipe, the pipe was cut and opened along the axial direction to obtain a flat plate. Then, a chisel test to punch a chisel into the pressure welded interfacial boundary and peel off the copper layer and the steel layer, microscopic observation, heating test, etc. were carried out. The results were all found to be good, and the pressure welding was carried out strongly.

EXAMPLE 2

A copper inner pipe 2 having an inner diameter of 52 mm, outer diameter of 60 mm and length of 1,250 mm was arranged in an aluminum outer pipe 4 having an inner diameter of 64 mm, outer diameter of 76 mm and length of 1,250 mm, and a paper cylinder having an inner diameter of 108 mm, outer diameter of 120 mm and length of 1,270 mm was used as an outer wall 5 of a container for charging an explosive. Explosion pressure welding was carried out in the same manner as in Example 1, whereby a copper-aluminum composite metallic pipe as good as that obtained in Example 1 was obtained.

EXAMPLE 3

A stainless steel inner pipe 2 having an inner diameter of 28 mm, outer diameter of 34 mm and length of 500 mm was inserted into an aluminum outer pipe 4 having an inner diameter of 39 mm, outer diameter of 45 mm and length of 500 mm, and a paper cylinder having an inner of diameter of 76 mm, outer diameter of 82 mm and length of 520 mm was used as an outer wall cylinder 5 of a container for charging an explosive. Explosion welding was carried out in the same manner as in Example 1, whereby a stainless steel-aluminum composite metallic pipe as good as that obtained in Example 1 was obtained.

EXAMPLE 4

A special asphalt compound prepared by mixing a blown asphalt as a base component with synthetic rubber, pigment, synthetic resin and special oil (a product of Fuji Rekisei Kogyo Co. Ltd., Japan: softening point of 70° – 80° C, penetration of 0 – 20 at 25° C) was heated and melted to a fluid, and was densely filled between a copper pipe 4 having an inner diameter of 60 mm, outer diameter of 89 mm and length of 500 mm, whose inner periphery was polished with a polishing paper No. 120, and a steel sheath cylinder 12 having an inner diameter of 100 mm, outer diameter of 240 mm and length of 500 mm, arranged coaxially with the copper pipe at the outside thereof to their full length.

In pouring the filler, it was necessary to provide a sink head part at the pouring end in the same manner as in Example 1.

By integrating the steel sheath cylinder with a copper pipe by the asphalt compound, the strength of the copper pipe 4 could be substantially increased. An 18 – 8 stainless steel pipe 2 having an inner diameter of 50 mm, outer diameter of 56 mm and length of 550 mm, whose outside periphery was polished with a polishing paper No. 200, was inserted in the copper pipe coaxially with the copper pipe. The bottom end of the stainless steel pipe was sealed by a wooden disc plug 6 having an outer diameter of 240 mm and thickness of 5 mm. The same explosive 7 as in Example 1 was evenly and densely filled in the stainless steel pipe and an electric detonator 9 was placed at the upper end of the explosive at the center, and said explosive 7 was exploded by said electric detonator, so that the detonation might proceed substantially in parallel with the axis of the pipes, whereby explosion welding of the copper pipe and the stainless steel pipe was carried out. At that time, the assembly was not directly vertically arranged on the ground or mounting base, but installed thereon through a paper cylinder 10 having a wall thickness of 5 mm, outer diameter of 240 mm and length of 200 mm, provided with a plurality of explosion gas outlet openings 11 on the periphery of the paper cylinder. Further, an aluminum ring having a thickness of 2 mm was inserted between the copper pipe and the stainless steel pipe at the upper end as a clearance retainer 3a to seal the clearance part at the upper end, and eight steel wires having a diameter of 2 mm and length of 20 mm were vertically inserted between the pipes at the bottom end to allow the gas in the clearance to be readily discharged.

The asphalt compound integrated with the thus obtained copper-stainless steel composite metallic pipe was removed from the composite pipe by heating the inside of the copper-stainless steel composite metallic pipe, and then the visual inspection of appearance and the examination of pressure welding property of the composite metallic pipe were carried out, and it was found that no deformation and breakage at the tip end were observed, and a double pipe strongly pressure-welded along the entire length and having a good surface could be obtained.

EXAMPLE 5

The same filler 1 as the asphalt compound used in Example 4 was filled in the space between a stainless steel pipe 4 (having an inside diameter of 108 mm, an outside diameter of 114 mm and a length of 400 mm) and a steel protecting pipe 12 (having an inside diameter of 164 mm, an outside diameter of 364 mm and a length of 400 mm) disposed concentrically to and at the outside of the above-mentioned stainless steel pipe throughout the entire length of confronting surfaces. In a copper pipe 2 (having an inside diameter of 97 mm, an outside diameter of 101 mm and a length of 450 mm) concentrically disposed to the stainless steel pipe 4 having been unified with the steel protecting pipe and the asphalt compound, an explosive is charged. If it is filled compactly throughout the entire length of the inside of the pipe, explosive power would be too strong. So a hollow paper cylinder (having an outside diameter of 60 mm, an inside diameter of 50 mm and a length of 450 mm) is inserted in the central part of the copper pipe and explosive is not charged in the inside of this paper cylinder to reduce the amount of explosive charged.

With the above-mentioned combination of various pipes, the same explosive is used as in Example 1 and an explosive welding was carried out by the same manner as in Example 1, whereby the stainless steel pipe acting as the substrate hardly show expantion or deformation of pipe and the deviation of outside diameter is less than 1 mm and welded state is extremely nice showing complete welding even at the end parts thereof.

By integrating an inner pipe or outer pipe as a substrate with a thermoplastic material capable of being converted into a fluid when heated and solidified at the ambient temperature, the strength of the pipe is increased as if it acts as an incompressible steel rod or an outer pipe having a larger thickness against the detonating pressure, and then the explosion pressure welding is carried out. Therefore, the pipe acting as the substrate undergoes no deformation almost at all and the pressure welding can be effected to both ends of the pipe. For example, it is particularly advantageous to pressure weld a pipe having a wall thickness of 1 mm or less as a substrate.

What is claimed is:

1. A method for producing a composite metallic pipe, where an inner pipe is inserted into and arranged coaxially with an outer pipe in a predetermined spaced relation, a container cylinder is arranged circumferentially in spaced relation around the outer pipe, an explosive is charged into the space between the outer pipe and the container cylinder, and an initiation of the explosion to weld the pipes is carried out from one end of the explosive thereby propagating a detonation of the explosive substantially in parallel with the axis of the pipes, wherein a thermoplastic material capable of being converted into a fluid when heated and being solidified at ambient temperature is filled inside the inner pipe to integrate said inner pipe with the plastic material, increase the strength of said inner pipe and prevent deformation of said inner pipe during bonding.

2. A method for producing a composite metallic pipe, where an inner pipe is inserted into and arranged coaxially with an outer pipe in a predetermined spaced relation, a metallic cylinder is arranged circumferentially in spaced relation around the outer pipe, an explosive is charged into the space within the inner cylinder, and an initiation of the explosion to weld the pipes is carried out from one end of the explosive thereby propagating a detonation of the explosive substantially in parallel with the axis of the pipes, wherein a thermoplastic material capable of being converted into a fluid when heated and being solidified at ambient temperature is filled within the space between the outer cylinder and the metallic cylinder to integrate the said outer pipe with the plastic material, increase the strengths of said outer pipe and prevent deformation of said outer pipe during bonding.

3. A method according to claim 1, wherein the plastic material is asphalt compound or tar pitch.

4. A method according to claim 1, wherein a steel ring is inserted at the upper end of the space between the inner and outer pipes to retain uniform clearance.

5. A method according to claim 4, wherein a plurality of steel wires are inserted at the lower end of said space, and a plug is fixed across the space separating the outer pipe and container cylinder.

* * * * *